US009796389B2

(12) United States Patent
Mizuno et al.

(10) Patent No.: US 9,796,389 B2
(45) Date of Patent: Oct. 24, 2017

(54) CONTROL DEVICE AND CONTROL METHOD FOR DRIVING DEVICE

(71) Applicant: TOYOTA JIDOSHA KABUSHIKI KAISHA, Toyota, Aichi-ken (JP)

(72) Inventors: Yoshihiro Mizuno, Nisshin (JP); Shinya Kuwabara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/502,550

(22) PCT Filed: Aug. 14, 2015

(86) PCT No.: PCT/IB2015/001373
§ 371 (c)(1),
(2) Date: Feb. 8, 2017

(87) PCT Pub. No.: WO2016/127145
PCT Pub. Date: Feb. 25, 2016

(65) Prior Publication Data
US 2017/0217439 A1    Aug. 3, 2017

(30) Foreign Application Priority Data

Aug. 21, 2014   (JP) ................................ 2014-168744

(51) Int. Cl.
*B60W 30/188*     (2012.01)
*B60W 10/06*      (2006.01)
(Continued)

(52) U.S. Cl.
CPC ........ *B60W 30/1882* (2013.01); *B60W 10/06* (2013.01); *B60W 10/107* (2013.01);
(Continued)

(58) Field of Classification Search
CPC .... B60W 10/06; B60W 10/10; B60W 10/107; B60W 30/1882; B60W 2510/0623; B60W 2710/0644
See application file for complete search history.

(56) References Cited

U.S. PATENT DOCUMENTS 8,801,559 B2 *  8/2014  Ogata ..................... F04C 2/102
                                                       475/162
8,840,524 B2 *  9/2014  Arsenault ............. B60W 10/06
                                                       477/5

(Continued)

FOREIGN PATENT DOCUMENTS

JP      2002-502337 A      1/2002
JP      2007-107698 A      4/2007
(Continued)

*Primary Examiner* — Edwin A Young
(74) *Attorney, Agent, or Firm* — Oliff PLC

(57) ABSTRACT

A control device for a driving device, the driving device includes a transmission and a hydraulic pressure generating device. The hydraulic pressure generating device includes an oil pump and a first mechanism. The first mechanism is configured to decrease hydraulic pressure of an oil passage connected with the oil pump. The control device includes an ECU. The ECU is configured to control the engine rotational speed to a first rotational speed and maintain vehicle speed by gear shifting, in a case where, while a vehicle is running in a predetermined running state, fuel consumption is smaller when the engine is driven at the first rotational speed, compared to fuel consumption in the predetermined running state, the first rotational speed is a rotational speed at which the hydraulic pressure is decreased, the predetermined running state being a running state in which the hydraulic pressure is not decreased.

7 Claims, 8 Drawing Sheets

(51) Int. Cl.
  *B60W 10/107* (2012.01)
  *B60W 30/19* (2012.01)
  *F16H 61/00* (2006.01)
  F04C 2/34 (2006.01)
  F04C 14/24 (2006.01)

(52) U.S. Cl.
  CPC ......... *B60W 30/19* (2013.01); *F16H 61/0025* (2013.01); *B60W 2510/0623* (2013.01); *B60W 2710/0644* (2013.01); *B60W 2710/1005* (2013.01); *B60W 2720/10* (2013.01); *F04C 2/34* (2013.01); *F04C 14/24* (2013.01); *F16H 2061/0015* (2013.01)

(56) References Cited

U.S. PATENT DOCUMENTS

| | | | |
|---|---|---|---|
| 2012/0053012 A1* | 3/2012 | Yamada | B60W 10/02 477/46 |
| 2012/0135840 A1* | 5/2012 | Tatewaki | B60W 10/06 477/115 |
| 2013/0170953 A1 | 7/2013 | Ogata et al. | |

FOREIGN PATENT DOCUMENTS

| | | |
|---|---|---|
| JP | 2012-017802 A | 1/2012 |
| JP | 2012-041830 A | 3/2012 |

* cited by examiner

FIG.8

| 1000 (rpm) | | LINE PRESSURE(PL) | | | | |
|---|---|---|---|---|---|---|
| | | PL1 | PL2 | PL3 | PL4 | PL5 |
| OIL TEMPERATURE (Toil) | T1 | △Ne11 | △Ne12 | △Ne13 | △Ne14 | △Ne15 |
| | T2 | △Ne21 | △Ne22 | △Ne23 | △Ne24 | △Ne25 |
| | T3 | △Ne31 | △Ne32 | △Ne33 | △Ne34 | △Ne35 |
| | T4 | △Ne41 | △Ne42 | △Ne43 | △Ne44 | △Ne45 |

CONTROL DEVICE AND CONTROL METHOD FOR DRIVING DEVICE

BACKGROUND OF THE INVENTION

1. Field of the Invention

The invention relates to a control device and a control method for a driving device.

2. Description of Related Art

A mechanical oil pump driven by an engine is known. In the oil pump, an oil delivery rate increases in proportion to an increase in rotational speed of the engine. Japanese Patent Application Publication No. 2012-17802 (JP 2012-17802 A) discloses an oil pump in which two ports, a high-pressure port and a low-pressure port, are formed. In JP 2012-17802 A, a hydraulic pressure generating device is disclosed. In this hydraulic pressure generating device, when engine rotational speed reaches given rotational speed or higher, oil consumption of a transmission is set to be satisfied by hydraulic pressure from the high-pressure port, and hydraulic pressure of the low-pressure port is switched to low hydraulic pressure. In this way, it is possible to reduce pump drive torque of the oil pump.

For example, in a driving device provided with a transmission by which gear shift is carried out based on a previously-set shift diagram, engine rotational speed is controlled based on the shift diagram. For example, in such a driving device, the shift diagram is set so as to reduce engine rotational speed in order to improve fuel economy.

SUMMARY OF THE INVENTION

In the case of the structure in which pump drive torque of the oil pump is increased at low engine rotational speed, and pump drive torque is decreased at high engine rotational speed like JP 2012-17802 A, pump drive torque of the oil pump is still large even if the engine rotational speed is merely maintained at low rotation. As a result, fuel economy may be deteriorated.

The invention provides a hydraulic control device and a control method for a driving device, by which fuel economy is improved. The driving device includes a hydraulic pressure generating device that is driven by an engine and reduces pump drive torque of an oil pump when engine rotational speed becomes high rotation.

The first aspect of the invention is a control device for driving device, the driving device including a transmission and a hydraulic pressure generating device, the transmission is configured to change rotation speed of an engine, the hydraulic pressure generating device is configured to generate hydraulic pressure fed to the transmission, the hydraulic pressure generating device is configured to be driven by the engine, the hydraulic pressure generating device includes an oil pump and a first mechanism, the oil pump is configured to increase an oil delivery rate in proportion to engine rotational speed of the engine, and the first mechanism is configured to decrease hydraulic pressure of an oil passage connected with a delivery port of the oil pump, when the oil delivery rate is larger than an oil consumption flow rate of the transmission. The control device includes an electronic control unit. The electronic control unit is configured to control the engine rotational speed to a first rotational speed and maintain vehicle speed by gear shifting regardless of the control of the engine rotational speed, in a case where, while a vehicle is running in a predetermined running state, fuel consumption is smaller when the engine is driven at the first rotational speed, compared to fuel consumption of the engine in the predetermined running state, the first rotational speed being an engine rotational speed at which hydraulic pressure of the oil passage is decreased, the predetermined running state being a running state in which hydraulic pressure of the oil passage is not decreased.

According to the above structure, while a vehicle is running in a running state in which hydraulic pressure of the oil passage is not decreased, when fuel consumption is smaller in a case where the engine is driven at rotational speed at which the hydraulic pressure of the oil passage is decreased, compared to fuel consumption of the engine in the above-mentioned running state, the engine rotational speed is controlled to the rotational speed at which the hydraulic pressure of the oil passage is decreased. Thus, fuel economy is improved. Since vehicle speed is maintained regardless of the control of the engine rotational speed, the vehicle speed is prevented from changing due to the control of the engine rotational speed.

In the foregoing control device, the electronic control unit may be configured to calculate a fuel consumption increase amount and a fuel consumption decrease amount, the fuel consumption increase amount is an increase amount of fuel when the engine rotational speed is increased to the first rotational speed, and the fuel consumption decrease amount is a decrease amount of fuel caused by a decrease in pump drive torque of the oil pump when the engine rotational speed is increased to the first rotational speed. The electronic control unit may be configured to determine, when the fuel consumption decrease amount is larger than the fuel consumption increase amount, that the fuel consumption is smaller when the engine is driven at the first rotational speed compared to the fuel consumption of the engine in the predetermined running state.

In the foregoing control device, the electronic control unit may be configured to calculate the first rotational speed. Thus, it is possible to calculate the rotational speed at which hydraulic pressure of the oil passage is decreased.

In the foregoing control device, the oil pump may be include a first suction port, a second suction port, a first delivery port, and a second delivery port. The first delivery port may be configured to deliver hydraulic oil that is sucked in from the first suction port. The second delivery port may be configured to deliver hydraulic oil that is sucked in from the second suction port. The oil passage may be connected with the second delivery port. The second suction port and the second delivery port may be communicated with each other when the engine rotational speed reaches the first rotational speed. As the second suction port and the second delivery port are communicated with each other, hydraulic oil circulates between the second suction port and the second delivery port. Therefore, a load of the oil pump is reduced, and pump drive torque is thus reduced.

In the foregoing control device, the electronic control unit may be configured to calculate the first rotational speed based on a flow rate balance between oil consumption of the transmission and an oil delivery rate of the oil pump. Thus, it is possible to accurately calculate the rotational speed, at which hydraulic speed of the oil passage is decreased, based on the flow rate balance between the oil consumption of the transmission and the oil delivery rate of the oil pump.

In the foregoing control device, the electronic control unit may be configured to calculate the first rotational speed based on a relation map that is obtained and stored in advance. Thus, it is possible to obtain the rotational speed, at which hydraulic pressure of the oil passage is decreased, while reducing a calculation load.

Further, it is preferred that a learning control part is provided, which learns a relation between the engine rotational speed and hydraulic pressure of the oil passage when a vehicle is stopped. Thus, it is possible to correct the relation map for obtaining the rotational speed, at which hydraulic pressure of the oil passage is decreased, based on a relation between the engine rotational speed and hydraulic pressure of the oil passage, which is learned by the learning control part. The relation map is corrected to an optimal value in consideration of individual variation and aging deterioration of a vehicle. Thus, fuel economy is improved even further.

The second aspect of the invention is a control method for a driving device, the driving device including a transmission and a hydraulic pressure generating device. The transmission is configured to change rotation speed of an engine. The hydraulic pressure generating device is configured to generate hydraulic pressure fed to the transmission. The hydraulic pressure generating device is configured to be driven by the engine. The hydraulic pressure generating device includes an oil pump and a first mechanism. The oil pump is configured to increase an oil delivery rate in proportion to engine rotational speed of the engine. The first mechanism is configured to decrease hydraulic pressure of an oil passage connected with a delivery port of the oil pump, when the oil delivery rate is larger than an oil consumption flow rate of the transmission. The control method includes controlling the engine rotational speed to a first rotational speed and maintaining vehicle speed by gear shifting regardless of the control of the engine rotational speed, in a case where, while a vehicle is running in a predetermined running state, fuel consumption is smaller when the engine is driven at the first rotational speed, compared to fuel consumption of the engine in the predetermined running state, the first rotational speed being an engine rotational speed at which hydraulic pressure of the oil passage is decreased, the predetermined running state being a running state in which hydraulic pressure of the oil passage is not decreased.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8 is an example of a relation map according to the above example for obtaining an increase amount of engine rotational speed, at which second delivery pressure is decreased, at given engine rotational speed.

DETAILED DESCRIPTION OF EMBODIMENTS

An example of the invention is explained in detail below with reference to the drawings. In the following example, the drawings are simplified or modified as appropriate, and a dimensional ratio, a shape, and so on of each part are not necessarily shown accurately.

Figure 1:
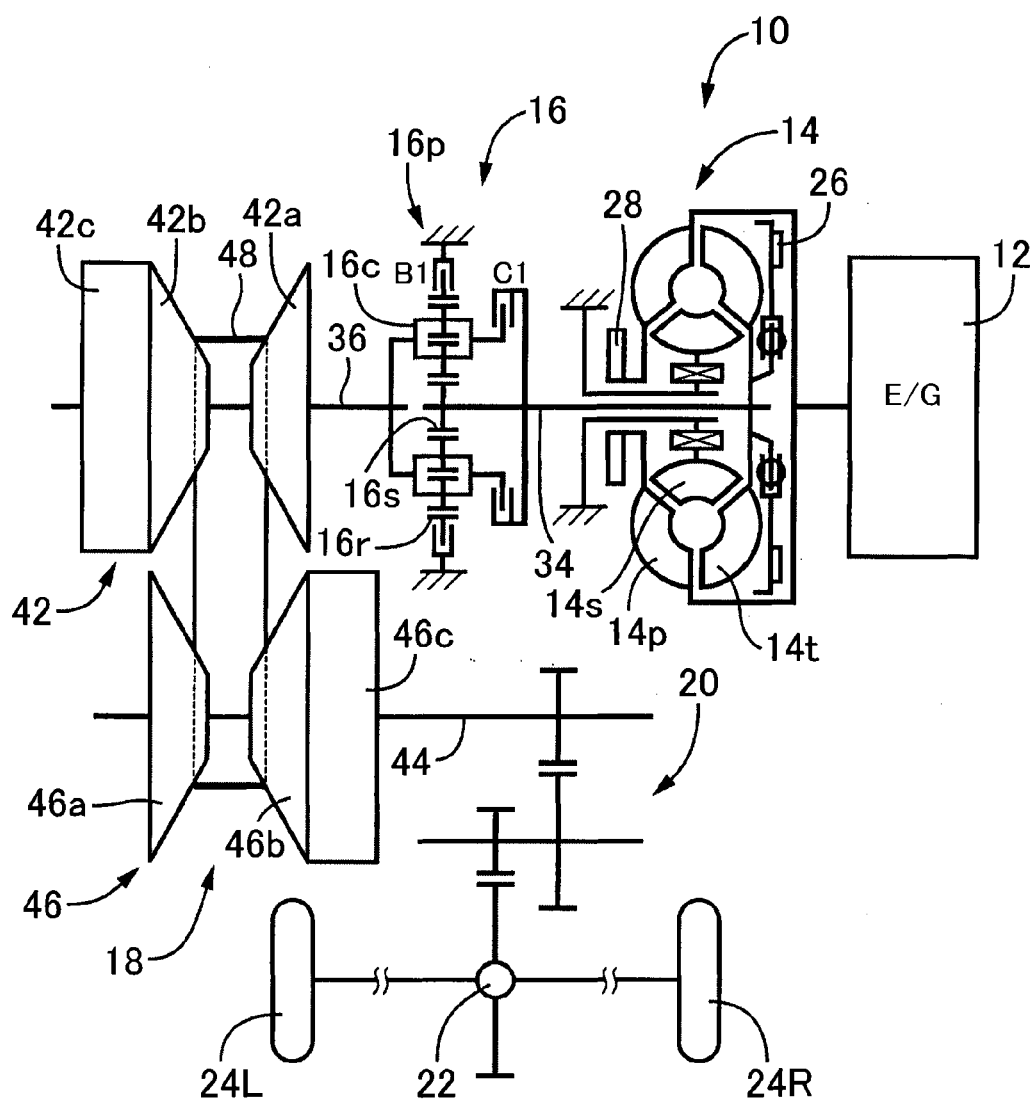
FIG. 1 is a skeleton view explaining a structure of a driving device according to an example of the invention.

FIG. 1 is a skeleton view explaining a structure of a driving device 10 to which the invention is applied. The driving device 10 is a horizontal automatic transmission, and is employed favorably for a front-engine front-drive (FF) vehicle. In this example, a vehicle includes an engine 12 as a driving source for running. The engine 12 is structured by an internal combustion engine. Output of the engine 12 is transmitted to a differential gear mechanism 22 through a crank shaft of the engine 12, a torque converter 14 as a fluid transmission device, a steering reverser 16, a belt-type continuously variable transmission (CVT) 18, and a mechanical reduction gear 20, and then distributed to left and right driving wheels 24L, 24R. The continuously variable transmission 18 changes rotational speed of the engine 12. The continuously variable transmission 18 is an example of a transmission.

The torque converter 14 is provided in a middle of a power transmission route between the engine 12 and the driving wheels 24. The torque converter 14 includes a pump impeller 14$p$ connected with the crank shaft of the engine 12, a turbine impeller 14$t$ connected with the steering reverser 16 through a turbine shaft 34 that corresponds to an output-side member of the torque converter 14, and a stator impeller 14$s$ that is inserted between the pump impeller 14$p$ and the turbine impeller 14$t$ and connected with a non-rotary member through a one-way clutch. The torque converter 14 transmits power through fluid. A lockup clutch 26 is provided between the pump impeller 14$p$ and the turbine impeller 14$t$. The lockup clutch 26 is engaged (fastened) or released as hydraulic pressure feed is switched between an engagement-side oil chamber and a release-side oil chamber of the lockup clutch 26. As the pump impeller 14$p$ and the turbine impeller 14$t$ are engaged with the lockup clutch 26, the pump impeller 14$p$ and the turbine impeller 14$t$ rotate integrally. In this way, the lockup clutch 26 selectively connects input and output of the torque converter 14 (the pump impeller 14$p$ and the turbine impeller 14$t$) directly with each other. A mechanical oil pump 28 is connected with the pump impeller 14$p$. Driven and rotated by the engine 12, the oil pump 28 generates hydraulic pressure. The hydraulic pressure generated by the oil pump 28 is used as hydraulic pressure for controlling gear shift of the continuously variable transmission 18, generating belt clamping force, controlling engagement and release of the lockup clutch 26, and feeding lubricant oil to each part. The pump impeller 14$p$ is connected with the engine 12 through the crankshaft. Therefore, the oil pump 28 is driven with rotation of the engine 12, and a delivery rate of hydraulic oil (an oil delivery rate) increases in proportion to engine rotational speed Ne.

The steering reverser 16 is structured mainly by a forward clutch C1, a reverse brake B1, and a double pinion type planetary gear 16$p$. The turbine shaft 34 of the torque converter 14 is connected integrally with a sun gear 16s. An input shaft 36 of the continuously variable transmission 18 is connected integrally with a carrier 16c. The carrier 16c and the sun gear 16s are connected with each other selectively through the forward clutch C1. A ring gear 16r is selectively fixed to a housing through the reverse brake B1. The forward clutch C1 and the reverse brake B1 are examples of an intermittent device. The forward clutch C1 and the reverse brake B1 are both hydraulic frictional engagement devices that are frictionally engaged by hydraulic actuators.

Once the forward clutch C1 is engaged and the reverse brake B1 is released, the steering reverser 16 rotates integrally, and the turbine shaft 34 is thus connected directly with the input shaft 36. Thus, a forward power transmission route is established (achieved), and drive power in a forward direction is transmitted to the continuously variable transmission 18 side. When the reverse brake B1 is engaged and the forward clutch C1 is released, the steering reverser 16 establishes a backward power transmission route. Thus, the input shaft 36 is rotated in an opposite direction with respect to the turbine shaft 34, and drive power in a backward direction is transmitted to the continuously variable transmission 18 side. When both the forward clutch C1 and the reverse brake B1 are released, the steering reverser 16 becomes a neutral state (a power transmission interrupted state) in which power transmission is interrupted.

The continuously variable transmission 18 is provided with a driving side pulley (a primary pulley) 42, a driven-side pulley (a secondary pulley) 46, and a transmission belt 48. The primary pulley 42 serves as an input side member provided in the input shaft 36 and has a variable effective diameter. The secondary pulley 46 serves as an output side member provided in an output shaft 44 and has a variable effective diameter. The transmission belt 48 is wound around the primary pulley 42 and the secondary pulley 46. Power is transmitted through frictional force between the primary pulley 42 and the secondary pulley 46, and the transmission belt 48.

The primary pulley 42 includes a fixed rotor 42a, a movable rotor 42b, and a driving side hydraulic actuator (a primary pulley-side hydraulic actuator) 42c. The fixed rotor 42a is fixed to the input shaft 36. The movable rotor 42b is provided so as not to rotate about an axis with respect to the input shaft 36 and so as to be able to move in an axial direction. The driving-side hydraulic actuator 42c is a hydraulic actuator that gives thrust to change widths of V-shaped grooves of the primary pulley 42 and the secondary pulley 46. The secondary pulley 46 includes a fixed rotor 46a, a movable rotor 46b, and a driven-side hydraulic actuator (a secondary pulley-side hydraulic actuator) 46c. The fixed rotor 46a is fixed to the output shaft 44. The movable rotor 46b is provided so as not to rotate about an axis relative to the output shaft 44 and so as to move in an axial direction. As feeding and delivery flow rates of hydraulic oil for the driving-side hydraulic actuator 42c are controlled by a hydraulic control circuit, the widths of the V-shaped grooves of the primary pulley 42 and the secondary pulley 46 change, and a winding diameter (an effective diameter) of the transmission belt 48 is thus changed. This way, a gear ratio γ (=input shaft rotation speed Nin/output shaft rotation speed Nout) is changed continuously. The hydraulic control circuit controls pressure regulation for belt clamping pressure Pd that is hydraulic pressure of the driven-side hydraulic actuator 46c. Thus, the transmission belt 48 is controlled so as not to slip.

Figure 2:
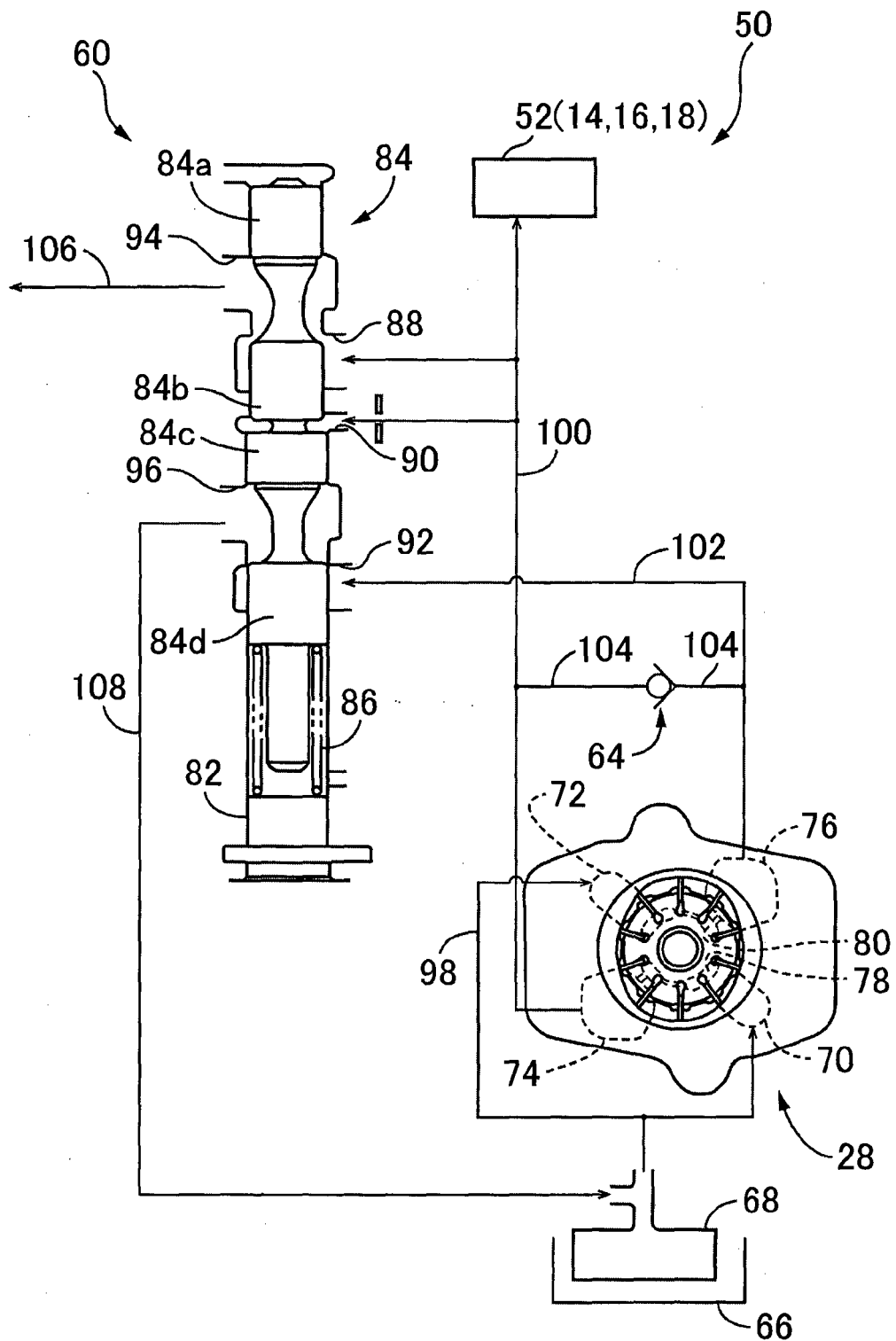
FIG. 2 is a schematic view for explaining a basic structure of a hydraulic pressure generating device that supplies hydraulic pressure to a steering reverser, a continuously variable transmission, and so on shown in FIG. 1.

FIG. 2 is a schematic view explaining a basic structure of a hydraulic pressure generating device 50 that feeds hydraulic pressure to the continuously variable transmission 18, the steering reverser 16, and so on. The hydraulic pressure generating device 50 includes the oil pump 28, a relief-type pressure regulating valve 60, and a check valve 64. The oil pump 28 feeds hydraulic oil to oil consumption devices 52. The oil consumption devices 52 include devices that consume hydraulic oil such as various parts to be lubricated, including the torque converter 14, the forward clutch C1 and the reverse brake B1 of the steering reverser 16, and the hydraulic cylinder of the continuously variable transmission 18. The pressure regulating valve 60 controls hydraulic pressure of hydraulic oil fed to the oil consumption devices 52 from the oil pump 28, such as line pressure.

The oil pump 28 is structured by a vane type oil pump. The oil pump 28 is rotated and driven as the engine 12 is driven. The oil pump 28 has a first suction port 70, a second suction port 72, a first delivery port 74, and a second delivery port 76 (a two-port oil pump). The first suction port 70 and the second suction port 72 are ports for the oil pump 28 to suck in hydraulic oil stored in an oil pan 66 through a strainer 68. The first delivery port 74 and the second delivery port 76 are ports for delivering the sucked hydraulic oil to outside the pump. The oil pump 28 has a first back pressure groove 78. The first back pressure groove 78 feeds back pressure in order to form a pump chamber around the first suction port 70 and the first delivery port 74. The oil pump 28 has a second back pressure groove. The second back pressure groove feeds back pressure in order to form a pump chamber around the second suction port 72 and the second delivery port 76.

The pressure regulating valve 60 is a relief-type pressure regulating valve, which regulates line pressure PL by using hydraulic pressure delivered from the oil pump 28 as source pressure. The line pressure PL is source pressure fed to the consumption devices 52. The pressure regulating valve 60 includes a body 82, a spool valve piece 84, and a spring 86. The spool valve piece 84 is fitted into a bore formed inside the body 82 so that the spool valve piece 84 is able to slide in an axial direction. The spring 86 biases the spool valve piece 84 in a valve closing direction (an upper direction in FIG. 2). The body 82 has a first input port 88, a feedback port 90, and a second input port 92 in this order from the top in the longitudinal direction in FIG. 2, and also has a first output port 94 and a second output port 96 similarly. The spool valve piece 84 has columnar land parts that are able to slide in an axial direction along an inner peripheral surface of the body 82. To be in more detail, the spool valve piece 84 includes a first land part 84a, a second land part 84b, a third land part 84c, and a fourth land part 84d in this order from the top in the axial direction in FIG. 2. The spool valve piece 84 is structured so that sectional areas of the first land part 84a and the second land part 84b are smaller than those of the third land part 84c and the fourth land part 84d. Here, the sectional areas are on planes orthogonal to the axial direction of the spool valve piece 84. Thus, the spool valve piece 84 is biased in a valve opening direction that is a direction opposite to biasing force of the spring 86, or downwardly in FIG. 2 by hydraulic pressure fed from the feedback port 90. In the pressure regulating valve 60, when the second land part 84b and the fourth land part 84d slide downwardly in FIG. 2 due to hydraulic pressure inputted from the feedback port 90, the first input port 88 and the first output port 94 are communicated with each other, and the second input port 92 and the second output port 96 are also communicated with each other.

A first oil passage 98 is connected with the first suction port 70 and the second suction port 72 of the oil pump 28 through the strainer 68. Thus, hydraulic oil stored in the oil pan 66 is sucked into the first suction port 70 and the second suction port 72 through the first oil passage 98. A first delivered oil passage 100 is connected with the first delivery port 74 of the oil pump 28, and the first input port 88 and the feedback port 90 of the pressure regulating valve 60, and is also connected with the oil consumption devices 52. Thus, hydraulic oil delivered from the first delivery port 74 is pumped to the oil consumption devices 52 (the torque converter 14, the steering reverser 16, the continuously variable transmission 18, and so on) and the pressure regulating valve 60 through the first delivered oil passage 100. A second delivered oil passage 102 is connected with the second delivery port 76 of the oil pump 28, and the second input port 92 of the pressure regulating valve 60. Thus, hydraulic oil delivered from the second delivery port 76 is delivered from the pressure regulating valve 60 through the second delivered oil passage 102. The second oil passage 104 allows hydraulic oil to flow from the second delivered oil passage 102 to the first delivered oil passage 100. At the same time, the second oil passage 104 connects the first delivered oil passage 100 and the second delivered oil passage 102 with each other through the check valve 64 that inhibits hydraulic oil from flowing from the first delivered oil passage 100 to the second delivered oil passage 102. A third oil passage 106 feeds hydraulic oil of the first delivered oil passage 100 to, for example, a second pressure regulating valve (not shown) when the pressure regulating valve 60 is open between the first input port 88 and the first output port 94. A fourth oil passage 108 circulates hydraulic oil of the second delivered oil passage 102 when the pressure regulating valve 60 is open between the second input port 92 and the second output port 96. The second delivered oil passage 102 is an example of an oil passage of the invention, and an oil passage connected with the second delivery port.

Figure 3:
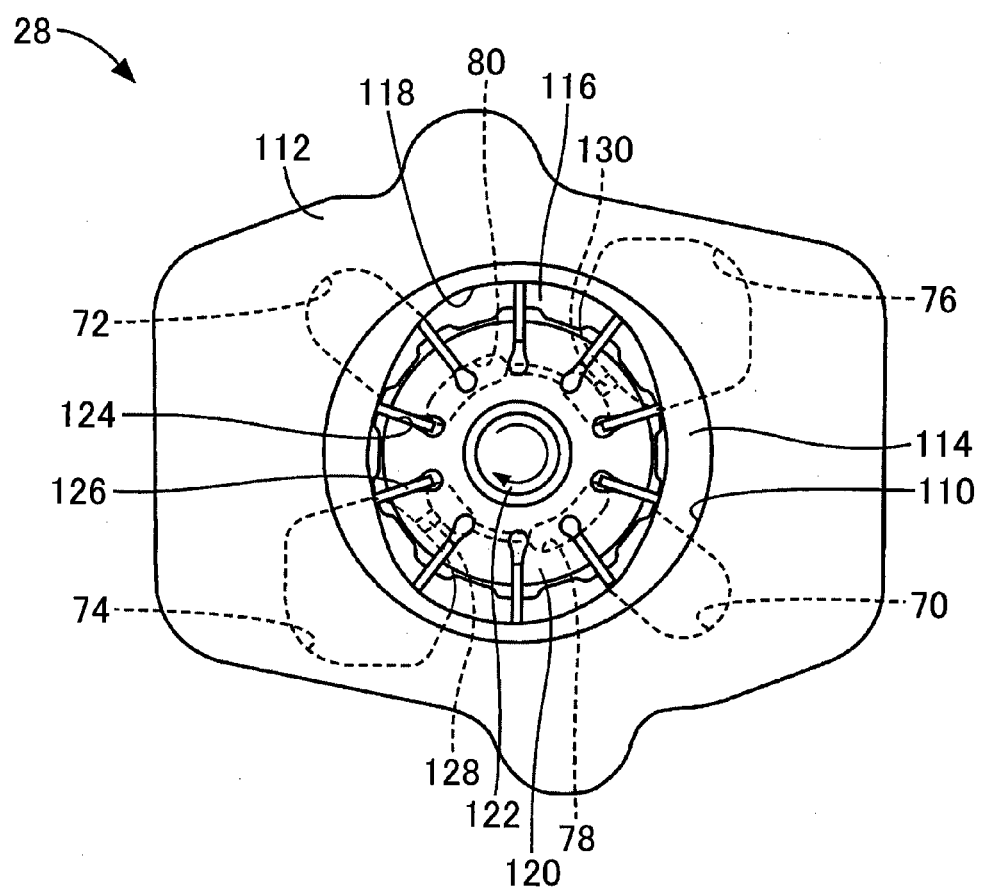
FIG. 3 is a front view showing a state where a pump cover of an oil pump shown in FIG. 2 is removed.

FIG. 3 is a front view showing a state where a pump cover of the oil pump 28 in FIG. 2 is removed. The oil pump 28 is structured from a housing 112, a cam ring 114, a side plate 116, a rotor 120, a pump shaft 122, and a pump cover (not shown). A generally columnar recessed part 110 is formed in the housing 112. The cam ring 114 has a generally cylindrical shape, and is fitted into the recessed part 110 so that the cam ring 114 is not able to rotate relative to the housing 112. The side plate 116 has a disk shape. The side plate 116 is mounted so as to be present between a bottom wall surface of the recessed part 110 and the cam ring 114, in a way that one flat surface of the side plate 116 abuts on the bottom wall surface of the recessed part 110 of the housing 112, and the other flat surface abuts on a generally circular end surface of the cam ring 114. The rotor 120 has a columnar shape. The rotor 120 is housed so that an outer peripheral surface of the rotor 120 faces an inner peripheral cam surface 118 of the cam ring 114 across a small space, and one end surface of the rotor 120 in a rotating direction is able to slide on the other flat surface of the side plate 116. The pump shaft 122 is fixed to the rotor 120 coaxially with the rotation axis of the rotor 120, and is structured to rotate the rotor 120 in the clockwise direction in accordance with drive of the engine 12. The pump cover is fastened to the housing 112 so that the pump cover abuts on the generally circular other end surface of the cam ring 114, and covers an opening of the recessed part 110 so as to be able to slide on the other end surface of the rotor 120 in the axis direction.

The cam ring 114 has the inner peripheral cam surface 118 that serves as an inner peripheral surface having a generally elliptical sectional shape. The rotor 120 includes a plurality of slits 124, and a plurality of vanes 126. The slits 124 are formed from a center part of the rotor 120 in a radial direction to the outer peripheral surface of the rotor 120 radially at equal angle interval in a circumferential direction throughout the entire axial length of the outer peripheral surface of the rotor 120. The vanes 126 have a rectangular flat plate shape, and are fitted into the slits 124, respectively. The vane 126 is pressed into the slit 124 so that side walls of the vane 126 positioned at circumferential direction of the rotor 120 are able to slide with respect to opposing inner side walls of the slit 124 in the radial direction of the rotor 120, that an axial side surface of the vane 126 is in sliding contact with the other end surface of the side plate 116 and an inner wall surface of the pump cover, respectively, and that the other end of the vane 126 on the radially outer side is able to slide with respect to the inner peripheral cam surface 118 of the cam ring 114.

As the rotor 120 is driven to rotate, the vanes 126 are pushed out to the radially outer side of the rotor 120 with respect to the inner side walls of the slits 124 by back pressure from the first back pressure groove 78 and the second back pressure groove 80, and the end surfaces of the vanes 126 on the radially outer side are pressed against the inner peripheral cam surface 118 of the cam ring 114. In this state, the vanes 126 slide with respect to the inner peripheral cam surface 118 in the rotating direction of the rotor 120. Therefore, a plurality of pump chambers P are defined by the side surfaces of the neighboring vanes 126, which face each other in the circumferential direction, the inner peripheral cam surface 118, the outer peripheral surface of the rotor 120, the other end surface of the side plate 116, and the inner wall surface of the pump cover. In the pump chambers P, since the inner peripheral cam surface 118 has a generally elliptical shape, the vanes 126 reciprocate twice in the slits 124 in the radial direction of the rotor 120 for one rotation of the rotor 120.

In the side plate 116, the pair of first suction port 70 and second suction port 72 are formed, sandwiching the pump shaft 122. The first suction port 70 and the second suction port 72 communicate with the pump chambers P, capacities of which increase in accordance with rotation of the rotor 120. In the side plate 116, the pair of first delivery port 74 and second delivery port 76 are formed, sandwiching the pump shaft 122. The first delivery port 74 and the second delivery port 76 communicate with the pump chambers P, capacities of which decrease in accordance with rotation of the rotor 120. The first delivery port 74 is positioned on the rotating direction side of the rotor 120 with respect to the first suction port 70, and the second delivery port 76 is positioned on the rotating direction side of the rotor 120 with respect to the second suction port 72.

In the side plate 116, the first back pressure groove 78 is formed into a semicircular shape in the circumferential direction of the rotor 120. The first back pressure groove 78 communicates with end parts of the slits 124 on the inner peripheral side. Here, the slits 124 define the pump chambers P between the first suction port 70 and the first delivery port 74, and the vanes 126 are fitted to the slits 124, respectively. The first back pressure groove 78 feeds back pressure that presses each of the vanes 126 against the inner peripheral cam surface 118. In the side plate 116, the second back pressure groove 80 is formed into a semicircular shape in the circumferential direction of the rotor 120. The second back pressure groove 80 communicates with end parts of the slits 124 in the inner peripheral side. Here, the slits 124 define the pump chambers P between the second suction port 72 and the second delivery port 76, and the vanes 126 are fitted to the slits 124, respectively. The second back pressure groove 80 feeds back pressure that presses each of the vanes 126 against the inner peripheral cam surface 118.

In the side plate 116, a first communication passage 128 is formed, which allows the first delivery port 74 and the first back pressure groove 78 to communicate with each other. Thus, the first delivered oil passage 100 and the first back pressure groove 78 are communicated with each other, and hydraulic pressure of the first delivered oil passage 100 acts on each of the vanes 126 through the first back pressure groove 78. Here, the vanes 126 define each of the pump chambers P between the first suction port 70 and the first delivery port 74. In the side plate 116, a second communication passage 130 is formed, which allows the second delivery port 76 and the second back pressure groove 80 to communicate with each other. Thus, the second delivered oil passage 102 and the second back pressure groove 80 are communicated with each other, and hydraulic pressure of the second delivered oil passage 102 acts on each of the vanes 126 through the second back pressure groove 80. Here, the vanes 126 define each of the pump chambers P between the second suction port 72 and the second delivery port 76.

As the oil pump 28 is driven in accordance with drive of the engine 12, and the rotor 120 is rotated in the clockwise direction in FIG. 3, hydraulic oil in the oil pan 66 is sucked into the first suction port 70 and the second suction port 72 through the first oil passage 98. In this way, the hydraulic oil in the oil pan 66 is carried to each of the pump chambers P of the oil pump 28. The capacities of the pump chambers P gradually increase due to rotation of the rotor 120. As the rotor 120 is rotated, the capacity of each of the pump chambers P is decreased. Accordingly, the hydraulic oil sucked into each of the pump chambers P is delivered to the first delivered oil passage 100 and the second delivered oil passage 102 from the first delivery port 74 and the second delivery port 76, respectively. The first communication passage 128 and the second communication passage 130 feed hydraulic pressure of the first delivered oil passage 100 and the second delivered oil passage 102, which are communicated with the first back pressure groove 78 and the second back pressure groove 80, respectively, as back pressure that presses an end surface of each of the vanes 126 on the radially outer side against the inner peripheral cam surface 118 of the cam ring 114. Here, the vanes 126 define each of the pump chambers P between the first suction port 70 and the first delivery port 74, and between the second suction port 72 and the second delivery port 76.

Figure 4:
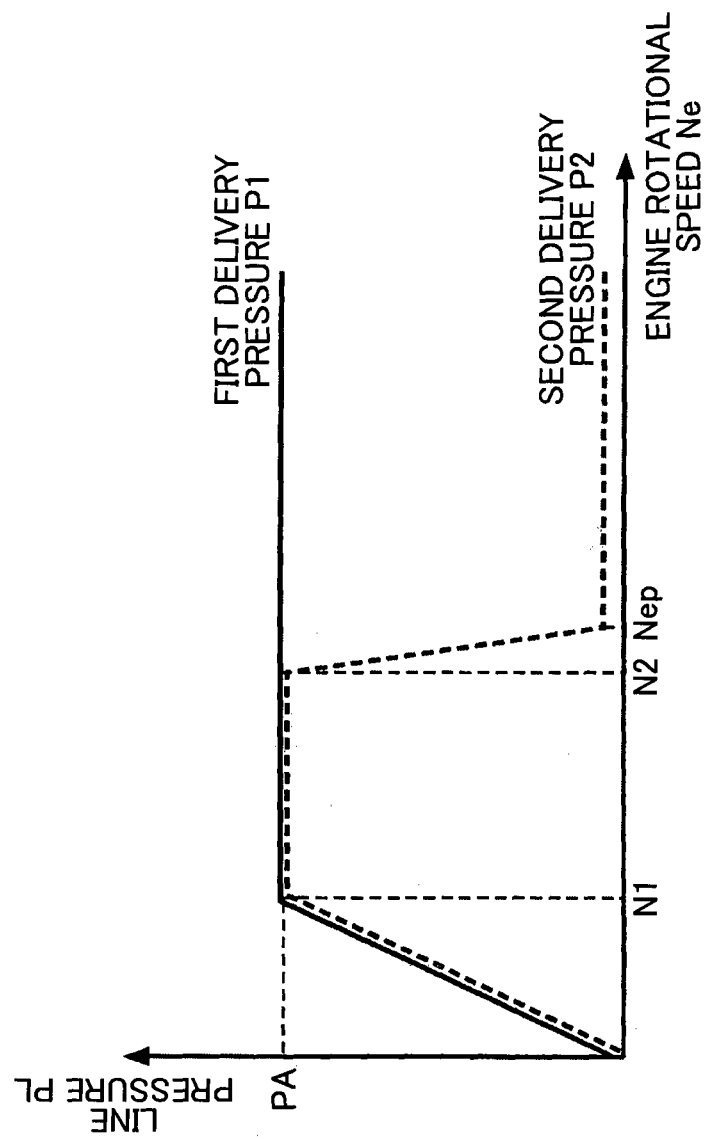
FIG. 4 is a view showing a relation among engine rotational speed, hydraulic pressure of a first delivered oil passage, and hydraulic pressure of a second delivered oil passage.

FIG. 4 is a view showing a relation between engine rotational speed Ne and oil pressure (line pressure) PL of each of the delivered oil passages in the hydraulic pressure generating device 50. Hydraulic pressure of hydraulic oil delivered from the first delivery port 74 to the first delivered oil passage 100 is referred to as first delivery pressure P1. When the engine rotational speed Ne is smaller than a given value N1, the rotor 120 is at low rotation, and the first delivery pressure P1 does not satisfy given hydraulic pressure PA required for the oil consumption devices 52, biasing force of the spring 86 in the valve closing direction is larger than biasing force provided by the first delivery pressure P1 to the feedback port 90 in the valve opening direction on the spool valve piece 84 of the pressure regulating valve 60. Therefore, the spool valve piece 84 is closed between the first input port 88 and the first output port 94, and between the second input port 92 and the second output port 96. At this time, hydraulic oil is allowed to flow from the second delivered oil passage 102 to the first delivered oil passage 100 side through the check valve 64. Thus, startup of pressure regulation by the pressure regulating valve 60 for the first delivered oil passage 100 is promoted. At the same time, the second delivery pressure P2 of the second delivered oil passage 102 becomes the same as the first delivery pressure P1.

When the engine rotational speed Ne is equal to or larger than the given value N1 but not exceeding N2, the spool valve piece 84 is opened and closed between the first input port 88 and the first output port 94. At the same time, the spool valve piece 84 is opened and closed between the second input port 92 and the second output port 96 in synchronization. Therefore, biasing force provided by the first delivery pressure P1 to the feedback port 90 in the valve opening direction of the spool valve piece 84, and biasing force of the spring 86 in the valve closing direction are balanced, and the first delivery pressure P1 becomes given hydraulic pressure PA. Hydraulic oil in the second delivered oil passage 102 is circulated, passing through the fourth oil passage 108 through the second input port 92 and the second output port 96 that are communicated with each other. The check valve 64 allows hydraulic oil to flow in the second oil passage 104 from the second delivered oil passage 102 side to the first delivered oil passage 100 side. Hence, the second delivery pressure P2 also becomes the hydraulic pressure PA that is the same as the first delivery pressure P1.

When the engine rotational speed Ne is equal to the given value N2 or larger, an amount of hydraulic oil in the first delivered oil passage 100 becomes sufficient for regulating the first delivery pressure P1 to the given hydraulic pressure PA. Therefore, corresponding to the flow rate of hydraulic oil of the first delivered oil passage 100, which has increased in proportion to high rotation of the rotor 120, a displacement amplitude of the spool valve piece 84 in the downward direction in FIG. 2 becomes even larger. Thus, an amount of hydraulic oil flown out from the first delivered oil passage 100 to the third oil passage 106, and an amount hydraulic oil flown out from the second delivered oil passage 102 to the fourth oil passage 108 are both increased. The first input port 88 and the first output port 94, and the second input port 92 and the second output port 96 are communicated with each other in synchronization. Sectional areas of openings of the second input port 92 and the second output port 96, which are communicated with each other, are larger than sectional areas of openings of the first input port 88 and the first output port 94. Therefore, hydraulic pressure within the second delivered oil passage 102 is reduced, and the check valve 64 is closed. Hence, a hydraulic circuit is formed as the second delivery port 76 and the second suction port 72 of the oil pump 28 are communicated with each other through the second delivered oil passage 102, the pressure regulating valve 60, the fourth oil passage 108, and the first oil passage 98, and hydraulic oil circulates within this hydraulic circuit.

When a delivery rate (an oil delivery rate) of hydraulic oil from the oil pump 28 becomes sufficiently larger than a consumption flow rate (an oil consumption flow rate) of hydraulic oil for the oil consumption devices 52, and the engine rotational speed Ne reaches first rotational speed Nep, then the second delivery pressure P2 stops decreasing. As a result, pump drive torque required to drive the oil pump 28 is reduced. In the driving device 10 having the hydraulic pressure generating device 50, the continuously variable transmission 18 is controlled to have a target gear ratio γ* that is calculated based on accelerator opening Acc, vehicle speed V, a brake signal Bon, and so on. In a stepped transmission, and so on, stepped gear shift is performed based on a previously-set shift diagram. The target gear ratio γ* and the shift diagram are set so that the engine 12 is driven at relatively low rotation of the engine rotational speed Ne. Thus, fuel economy is improved.

When the oil pump 28 has the two delivery ports, that are the first delivery port 74 and the second delivery port 76, and the delivery rate (oil delivery rate) of hydraulic oil of the oil pump 28 becomes larger than the consumption flow rate (oil consumption flow rate) of the oil consumption devices 52, the second delivery pressure P2 is decreased, and the pump drive torque is reduced. On the contrary, when controls is performed to keep the engine rotational speed Ne at low rotation, the second delivery pressure P2 is not decreased, and the pump drive torque becomes large. As a result, engine torque is required, and there are instances where fuel economy becomes worse than that when the engine 12 is driven at even higher rotation. The second delivery pressure P2 is an example of hydraulic pressure of the oil passage.

In this example, when a vehicle is running in a running state where the second delivery pressure P2 is not decreased, the engine rotational speed Ne is controlled to be the first rotational speed Nep, at which the second delivery pressure P2 is decreased, in a case where fuel consumption is smaller when the engine 12 is driven at the engine rotational speed Ne, at which the second delivery pressure P2 is decreased, compared to fuel consumption of the engine 12 in the above-mentioned running state. Thus, fuel economy is improved even more. Herein below, control operations of an electronic control unit 140 that controls the driving device 10 are explained. The first rotational speed Nep is an example of rotational speed at which hydraulic pressure of the oil passage is decreased.

Figure 5:
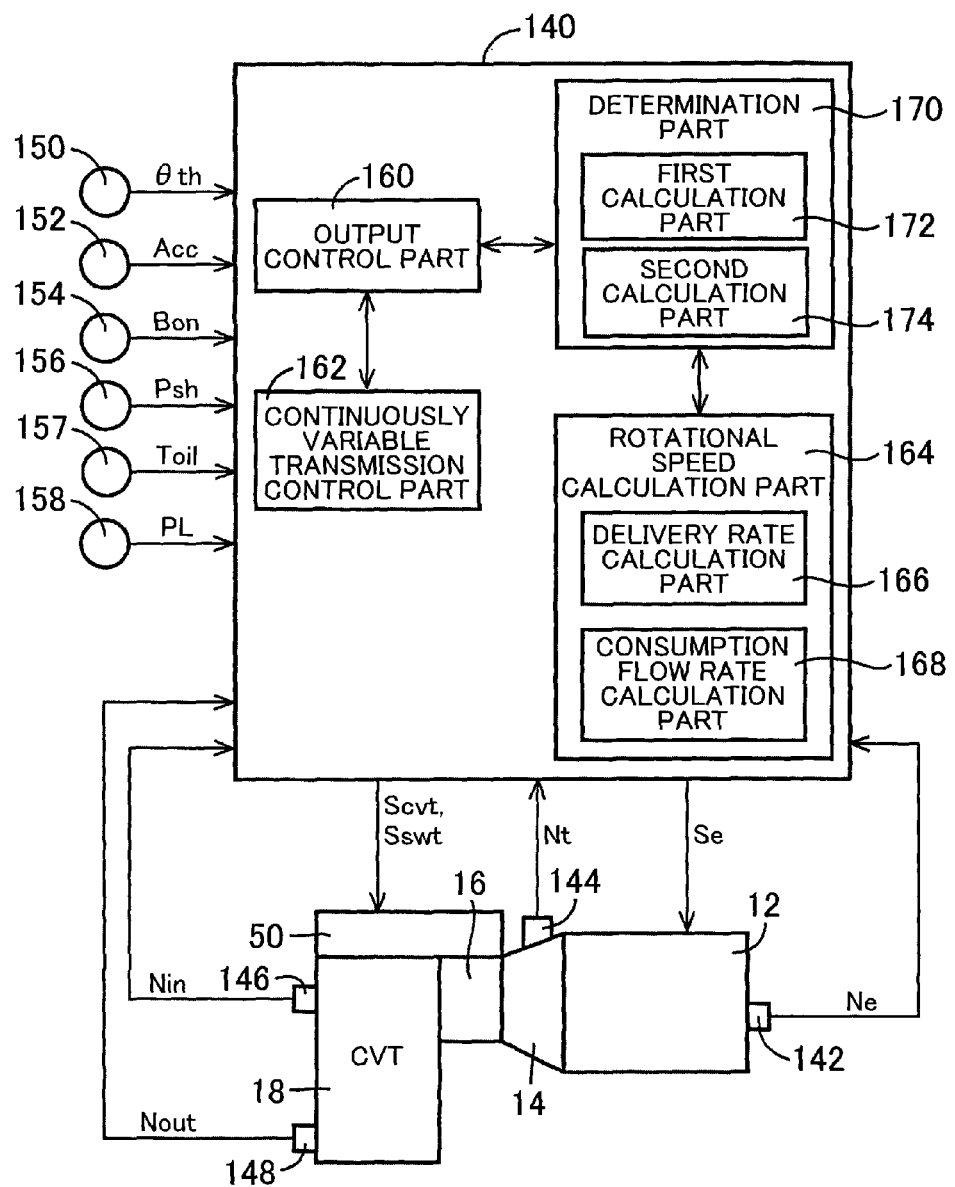
FIG. 5 is a function block diagram explaining an input and output system of an electronic control unit that controls the driving device shown in FIG. 1, and also explaining a main part of control operation by the electronic control unit.

FIG. 5 is a function block diagram that explains an input and output system of the electronic control unit 140 that controls the driving device 10 according to this example, and also explains a main part of the control operations by the electronic control unit 140. The electronic control unit 140 is structured by including a so-called microcomputer having, for example, a CPU, a RAM, a ROM, an input and output interface, and so on. The CPU executes signal processing based on programs stored in the ROM while using a temporary storage function of the RAM. In this way, the electronic control unit 140 performs various controls for the driving device 10. For example, the electronic control unit 140 executes output control for the engine 12, gear shift control and belt clamping force control for the continuously variable transmission 18, and so on. The electronic control unit 140 is structured by being divided for engine control, continuously variable transmission control, switching of driving pattern, and so on where necessary.

Signals expressing an rotation angle (position) Acr of the crank shaft and rotational speed (engine rotational speed) Ne of the engine 12, a signal expressing rotational speed (turbine rotational speed) Nt of the turbine shaft 34, a signal expressing input shaft rotational speed Nin, and a signal expressing output shaft rotational speed Nout are supplied to the electronic control unit 140. The rotation angle (position) Acr of the crank shaft, and the engine rotational speed Ne are detected by an engine rotational speed sensor 142. The turbine rotational speed Nt is detected by a turbine rotational speed sensor 144. The input shaft rotational speed Nin is rotational speed of the input shaft 36 (the primary pulley 42) of the continuously variable transmission 18 and is detected by the input shaft rotational speed sensor 146. The output shaft rotational speed Nout is rotational speed of the secondary pulley 46 of the continuously variable transmission 18, which corresponds to vehicle speed V, and is detected by an output shaft rotational speed sensor 148. In addition, a signal expressing a throttle opening θth, a signal expressing an accelerator opening Acc, a signal expressing that brake is on Bon, a signal expressing a lever position (an operating position) Psh, a signal expressing oil temperature Toil, a signal expressing line pressure PL, and so on are supplied to the electronic control unit 140. The throttle opening θth is an opening of an electronic throttle valve, which is detected by a throttle sensor 150. The accelerator opening Acc is an accelerator pedal operation amount, which is detected by an accelerator opening sensor 152 as acceleration requested by a driver. The brake signal Bon showing that the brake is on indicates a state where a foot brake serving as a service braking system is operated, and this state is detected by a foot brake switch 154. The operating position Psh is a position of a gear shift lever, which is detected by a lever position sensor 156. The oil temperature Toil is temperature of hydraulic oil flowing inside the hydraulic pressure generating device 50, and is detected by an oil temperature sensor 157. The line pressure PL is pressure regulated by the pressure regulating valve 60, and detected by a hydraulic pressure sensor 158.

The electronic control unit 140 outputs an engine output control command signal Se for controlling output of the engine 12, a hydraulic pressure control command signal Scvt for controlling hydraulic pressure related to gear shift of the continuously variable transmission 18, a hydraulic pressure control command signal Sswt for controlling the steering reverser 16 (the forward clutch C1, the reverse brake B1), and so on. To be specific, as the foregoing engine output control command signal Se, the electronic control unit 140 outputs a throttle signal for controlling opening and closing of the electronic throttle valve by driving a throttle actuator, an injection signal for controlling an amount of fuel injected from a fuel injector, an ignition timing signal for controlling timing to ignite the engine 12 by using an ignition device, and so on. As the hydraulic pressure control command signal Scvt, the electronic control unit 140 outputs a command signal for driving a linear solenoid valve (not shown) that regulates primary pressure Pin fed to the primary side hydraulic actuator 42c, a command signal for driving a linear solenoid valve (not shown) that regulates a secondary pressure Pout fed to the secondary hydraulic actuator 46c, and so on to the hydraulic control circuit. As the hydraulic pressure control command signal Sswt, the electronic control unit 140 outputs a command signal for driving each linear solenoid valve for controlling hydraulic pressure fed to the forward clutch C1 and the reverse brake B1, and so on to the hydraulic control circuit.

Next, control functions of the electronic control unit 140 are explained. The electronic control unit 140 functionally includes an output control part 160, a continuously variable transmission control part 162, a rotational speed calculation part 164, a delivery rate calculation part 166, a consumption flow rate calculation part 168, a determination part 170, a first calculation part 172 that calculates increase amount of fuel consumption, and a second calculation part 174 that calculates decrease amount of fuel consumption.

The output control part 160 shown in FIG. 5 outputs the engine output control command signals Se such as the throttle signal, the injection signal, and the ignition timing signal, for controlling output of the engine 12, to the throttle actuator, the fuel injector, and the ignition device, respectively. For example, the output control part 160 sets target engine torque Te* for obtaining requested driving force (driving torque) calculated based on the accelerator opening Acc and the vehicle speed V. The output control part 160 controls opening and closing of the electronic throttle valve by the throttle actuator, an amount of fuel injected by the fuel injector, and timing for ignition by the ignition device, so that the set target engine torque Te* is obtained.

The continuously variable transmission control part 162 controls a gear ratio γ of the continuously variable transmission 18 so as to obtain the target gear ratio γ* that is calculated based on the accelerator opening Acc, the vehicle speed V, and the brake signal Bon. Specifically, the continuously variable transmission control part 162 determines primary indicated pressure Pintgt as a command value of the primary pressure Pin (target primary pressure Pin*), and secondary indicated pressure Pouttgt as a command value of the secondary pressure Pout (target secondary pressure Pout*) so that the target gear ratio γ* of the continuously variable transmission 18, by which an operating point of the engine 12 comes on an optimal line, is achieved while preventing belt slippage of the continuously variable transmission 18. The continuously variable transmission control part 162 outputs the determined primary indicated pressure Pintgt and the secondary indicated pressure Pouttgt to the linear solenoid valves (not shown) that control the primary pressure Pin and the secondary pressure Pout.

The rotational speed calculation part 164 calculates the engine first rotational speed Nep at which the second delivery pressure P2 of the oil pump 28 is decreased. The rotational speed calculation part 164 is structured by including a delivery rate calculation part 166 and a consumption flow rate calculation part 168.

The delivery rate calculation part 166 calculates a delivery rate Qout (an oil delivery rate) of hydraulic oil delivered from the oil pump 28. The delivery rate calculation part 166 calculates the delivery rate Qout from a product of the engine rotational speed Ne and a capacity of the oil pump 28. Therefore, the delivery rate Qout increases in proportion to the engine rotational speed Ne. The delivery rate Qout of hydraulic oil calculated by the delivery rate calculation part 166 is the sum total of hydraulic oil delivered from the first delivery port 74 and the second delivery port 76 of the oil pump 28.

The consumption flow rate calculation part 168 calculates a consumption flow rate Qloss of hydraulic oil consumed in the oil consumption devices 52. The consumption flow rate Qloss of hydraulic oil is the sum total of a consumption flow rate of hydraulic oil consumed in the oil consumption devices 52. The sum total of the consumption flow rate of the hydraulic oil contains, for example, a consumption flow rate of hydraulic oil used for gear shift control of the continuously variable transmission 18 (a flow rate of hydraulic oil used for control of the driving-side hydraulic actuator 42c and the driven-side hydraulic actuator 46c), a consumption flow rate of hydraulic oil used for switching control of the steering reverser 16 (the forward clutch C1 and the reverse brake B1), a consumption flow rate of hydraulic oil used for lockup control of the torque converter 14, and a leakage rate of hydraulic oil in the hydraulic control circuit. The consumption flow rate calculation part 168 presumptively calculates the consumption flow rate Qloss of hydraulic oil based on, for example, a consumption flow rate calculation map that calculates the consumption flow rate Qloss of hydraulic oil. The consumption flow rate calculation map is experimentally obtained in advance. The consumption flow rate calculation map is structured by, for example, a two-dimensional map, in which oil temperature Toil of hydraulic oil, and line pressure PL regulated by the pressure regulating valve 60 serve as parameters. Then, the consumption flow rate Qloss is presumptively calculated based on the consumption flow rate calculation map from the oil temperature Toil and the line pressure PL detected as required. The oil consumption flow rate of the transmission in this example contains the entire hydraulic oil consumed in the driving device 10, which includes not only the consumption flow rate of the continuously variable transmission 18, but also the consumption flow rate of the steering reverser 16, the consumption flow rate of the torque converter 14, and leakage from the hydraulic control circuit.

The rotational speed calculation part 164 presumes the engine first rotational speed Nep, at which the second delivery pressure P2 is decreased, based on the delivery rate Qout of hydraulic oil calculated by the delivery rate calculation part 166, and the consumption flow rate Qloss of hydraulic oil calculated by the consumption flow rate calculation part 168. The rotational speed calculation part 164 calculates the engine first rotational speed Nep, at which the second delivery pressure P2 is decreased, based on, for example, a flow rate balance, which is a difference between the delivery rate Qout and the consumption flow rate Qloss. Alternatively, the rotational speed calculation part 164 stores a relation map of the engine first rotational speed Nep, at which the second delivery pressure P2 is decreased. The relation map is made from the delivery rate Qout of hydraulic oil and the consumption flow rate Qloss of hydraulic oil and is obtained experimentally in advance. Then, the rotational speed calculation part 164 calculates the first rotational speed Nep from the relation map based on the delivery rate Qout and the consumption flow rate Qloss that are calculated as required.

The determination part 170 compares a fuel consumption increase amount Lup and a fuel consumption decrease amount Ldown of the engine 12. The fuel consumption increase amount Lup is caused by an increase in engine rotational speed to the first rotational speed Nep calculated by the rotational speed calculation part 164. The fuel consumption decrease amount Ldown is caused by a decrease in pump drive torque due to a decrease in the second delivery pressure P2. Then, the determination part 170 determines whether or not the fuel consumption decrease amount Ldown is larger than the fuel consumption increase amount Lup.

The determination part 170 includes a first calculation part 172 and a second calculation part 174.

The first calculation part 172 calculates fuel consumption when the engine rotational speed Ne is increased to the first rotational speed Nep at which the second delivery pressure P2 is decreased. The first calculation part 172 then calculates a fuel consumption increase amount Lup, which is a difference from fuel consumption in the current driving state of the engine 12. The first calculation part 172 calculates a fuel injection amount L1 corresponding to current fuel consumption based on current engine rotational speed Ne and accelerator opening Acc, from a fuel injection amount map made of engine rotational speed Ne and accelerator opening Acc. The fuel injection amount map is previously obtained and stored. Also, from the above-mentioned fuel injection amount map, the first calculation part 172 calculates a fuel injection amount L2 corresponding to fuel consumption when the engine rotational speed Ne is increased to the first rotational speed Nep, at which the second delivery pressure P2 is decreased, based on the first rotational speed Nep, at which the second delivery pressure P2 is decreased, and the accelerator opening Acc. Then, the first calculation part 172 calculates a fuel consumption increase amount Lup from a difference between the calculated fuel injection amount L2 and fuel injection amount L1 (=L2−L1).

The second calculation part 174 calculates the fuel consumption decrease amount Ldown due to a decrease in pump drive torque when the engine rotational speed Ne is increased to the first rotational speed Nep at which the second delivery pressure P2 is decreased. The second calculation part 174 calculates the fuel consumption decrease amount Ldown based on the line pressure PL, from, for example, a relation map of the line pressure PL and the fuel consumption decrease amount Ldown. The relation map is obtained and stored in advance.

The determination part 170 determines whether or not the fuel consumption decrease amount Ldown calculated by the second calculation part 174 is larger than the fuel consumption increase amount Lup calculated by the first calculation part 172. When the fuel consumption decrease amount Ldown is larger than the fuel consumption increase amount Lup, it is determined that fuel consumption is smaller in the case where the engine 12 is driven at the first rotational speed Nep at which the second delivery pressure P2 is decreased, than fuel consumption of the engine 12 in a running state in which the second delivery pressure P2 is not decreased. In such a case, the output control part 160 executes control to increase the engine rotational speed Ne to the first rotational speed Nep at which the second delivery pressure P2 is decreased. Therefore, fuel economy is improved compared to the case where the engine 12 is controlled based on normal gear shift control.

When the engine rotational speed Ne is increased to the first rotational speed Nep, vehicle speed V is increased accordingly. In order to prevent this, the continuously variable transmission control part 162 carries out gear shift control of the continuously variable transmission 18 so that the vehicle speed V is maintained regardless of the control of the engine rotational speed Ne by the output control part 160. The continuously variable transmission control part 162 calculates the target gear ratio γ*, at which the vehicle speed V is maintained, as necessary based on target rotational speed of the engine 12 that is outputted from the output control part 160 as necessary. Then, the continuously variable transmission control part 162 carried out gear shift control of the continuously variable transmission 18 so that the gear ratio γ* is realized. Therefore, the vehicle speed V is prevented from changing (increasing) because the continuously variable transmission control part 162 carries out gear shift control of the continuously variable transmission 18 so that the vehicle speed V is maintained while the output control part 160 is controlling (changing) the engine rotational speed Ne.

Meanwhile, when the fuel consumption decrease amount Ldown is smaller than the fuel consumption increase amount Lup, it is determined that fuel consumption is smaller when the engine 12 is driven in a current running state in which the second delivery pressure P2 is not decreased, than fuel consumption when the engine 12 is driven at the first rotational speed Nep at which the second delivery pressure P2 is decreased. In such a case, the output control part 160 performs control to obtain the engine rotational speed Ne that is set based on normal gear shift control by which the second delivery pressure P2 is not decreased.

Figure 6:
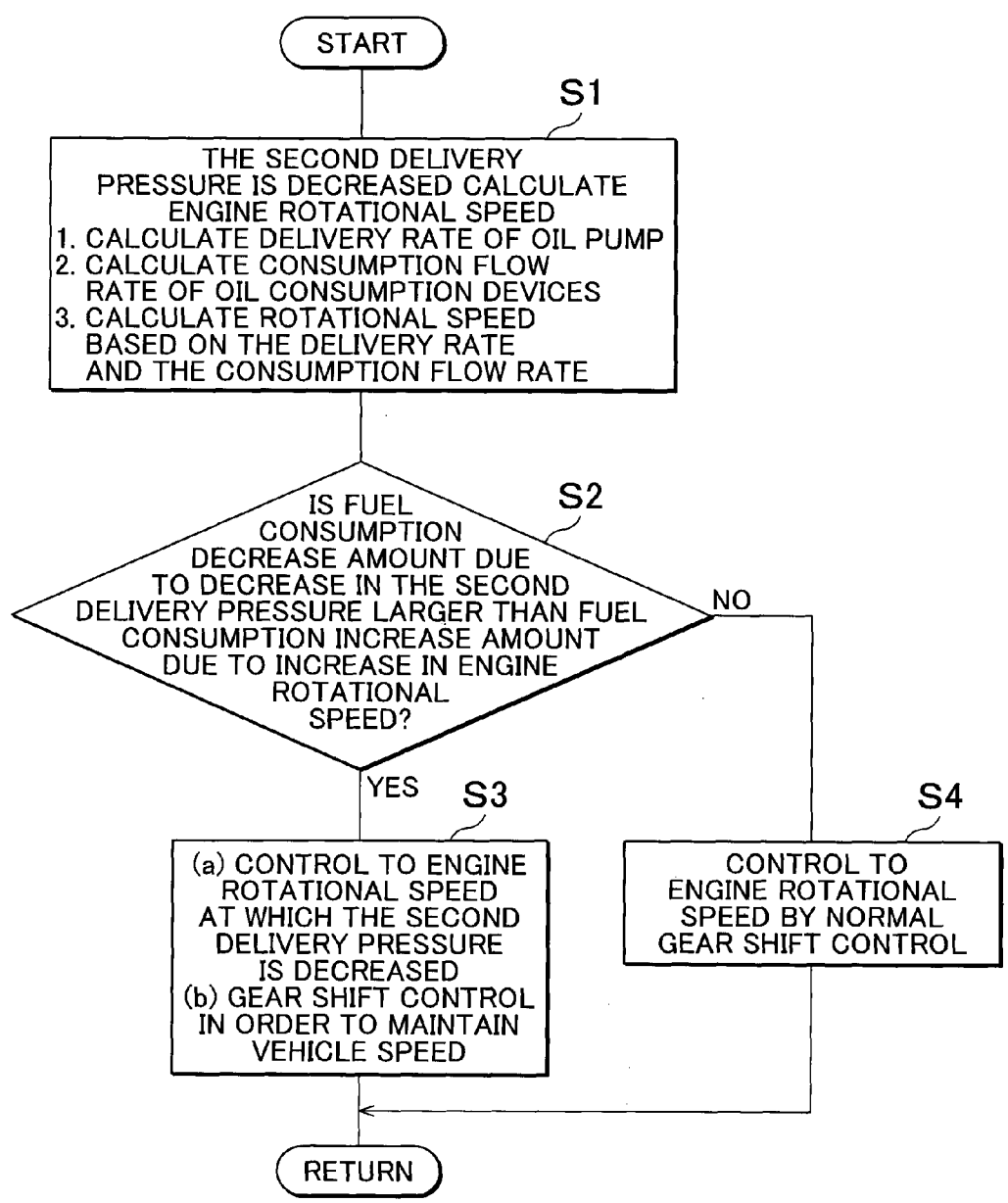
FIG. 6 is a flowchart for explaining the main part of the control operation by the electronic control unit shown in FIG. 5, or the control operation for further improving fuel economy of the driving device.

FIG. 6 is a flowchart for explaining a main part of the control operations by the electronic control unit 140, or the control operations that improve fuel economy of the driving device 10 even further. This flowchart is carried out repeatedly in an extremely short cycle time from about several milliseconds to several tens of milliseconds.

First of all, the electronic control unit 140 carries out step S1 (herein after, the word "step" is omitted) that corresponds to the rotational speed calculation part 164, the delivery rate calculation part 166, and the consumption flow rate calculation part 168. In S1, a delivery rate Qout of hydraulic oil from the oil pump 28 is calculated. At the same time, a consumption flow rate Qloss of hydraulic oil in the oil consumption devices 52 is calculated. Then, the engine first rotational speed Nep, at which the second delivery pressure P2 is decreased, is calculated based on a flow rate balance between the delivery rate Qout and the consumption flow rate Qloss of the hydraulic oil.

Next, in S2 corresponding to the determination part 170, the first calculation part 172, and the second calculation part 174, the electronic control unit 140 calculates the fuel consumption increase amount Lup in the case where the engine rotational speed Ne is controlled to the first rotational speed Nep at which the second delivery pressure P2 is decreased, and the fuel consumption decrease amount Ldown caused by a decrease in pump drive torque of the oil pump 28 in the case where the engine rotational speed Ne is controlled to the first rotational speed Nep at which the second delivery pressure P2 is decreased. Then, it is determined whether or not the fuel consumption decrease amount Ldown is larger than the fuel consumption increase amount Lup.

When it is affirmative in S2, or the fuel consumption decrease amount Ldown is larger than the fuel consumption increase amount Lup, the control proceeds to S3 that corresponds to the output control part 160 and the continuously variable transmission control part 162. Then, the engine rotational speed Ne is increased to the first rotational speed Nep at which the second delivery pressure P2 is decreased. In parallel with this, a gear ratio γ of the continuously variable transmission 18 is changed continuously in accordance with the change of the engine rotational speed Ne so that the vehicle speed V does not change due to the change of the engine rotational speed Ne. Therefore, fuel economy is improved more compared to the case where the engine 12 is controlled based on normal gear shift control. In addition, the vehicle speed V is prevented from changing due to the change of the engine rotational speed Ne. Meanwhile, when it is negative in S2, or the fuel consumption decrease amount Ldown is smaller than the fuel consumption increase amount Lup, the engine rotational speed Ne is controlled to rotational speed based on normal gear shift control in S4 that corresponds to the output control part 160.

As explained so far, according to this example, while a vehicle is running in a running state in which the second delivery pressure P2 is not decreased, when the fuel consumption is smaller in the case where the engine 12 is driven at first rotational speed Nep at which the second delivery pressure P2 is decreased, than the fuel consumption of the engine 12 in the above-mentioned running state, the engine rotational speed Ne is controlled to the first rotational speed Nep at which the second delivery pressure P2 is decreased. Therefore, fuel economy is improved. Since the vehicle speed V is maintained regardless of the control of the engine rotational speed Ne, vehicle speed is prevented from changing due to the control of the engine rotational speed Ne.

According to this example, by comparing the fuel consumption increase amount Lup and the fuel consumption decrease amount Ldown, it is possible to determine that the fuel consumption is smaller in the case where the engine 12 is rotated at the first rotational speed Nep, at which the second delivery pressure P2 is decreased, compared to the fuel consumption of the engine 12 in the running state in which the second delivery pressure P2 is not decreased.

According to this example, in the hydraulic pressure generating device 50, when the engine rotational speed Ne reaches the first rotational speed Nep at which the second delivery pressure P2 is decreased, the second suction port 72 and the second delivery port 76 are communicated with each other, and hydraulic oil thus circulates between the second suction port 72 and the second delivery port 76. Hence, a load on the oil pump 28 is reduced and pump drive torque is decreased.

Next, another example of the invention is explained. In the following explanation, parts that are common to those in the foregoing example are denoted by the same reference numerals, and explanation is omitted.

Figure 7:
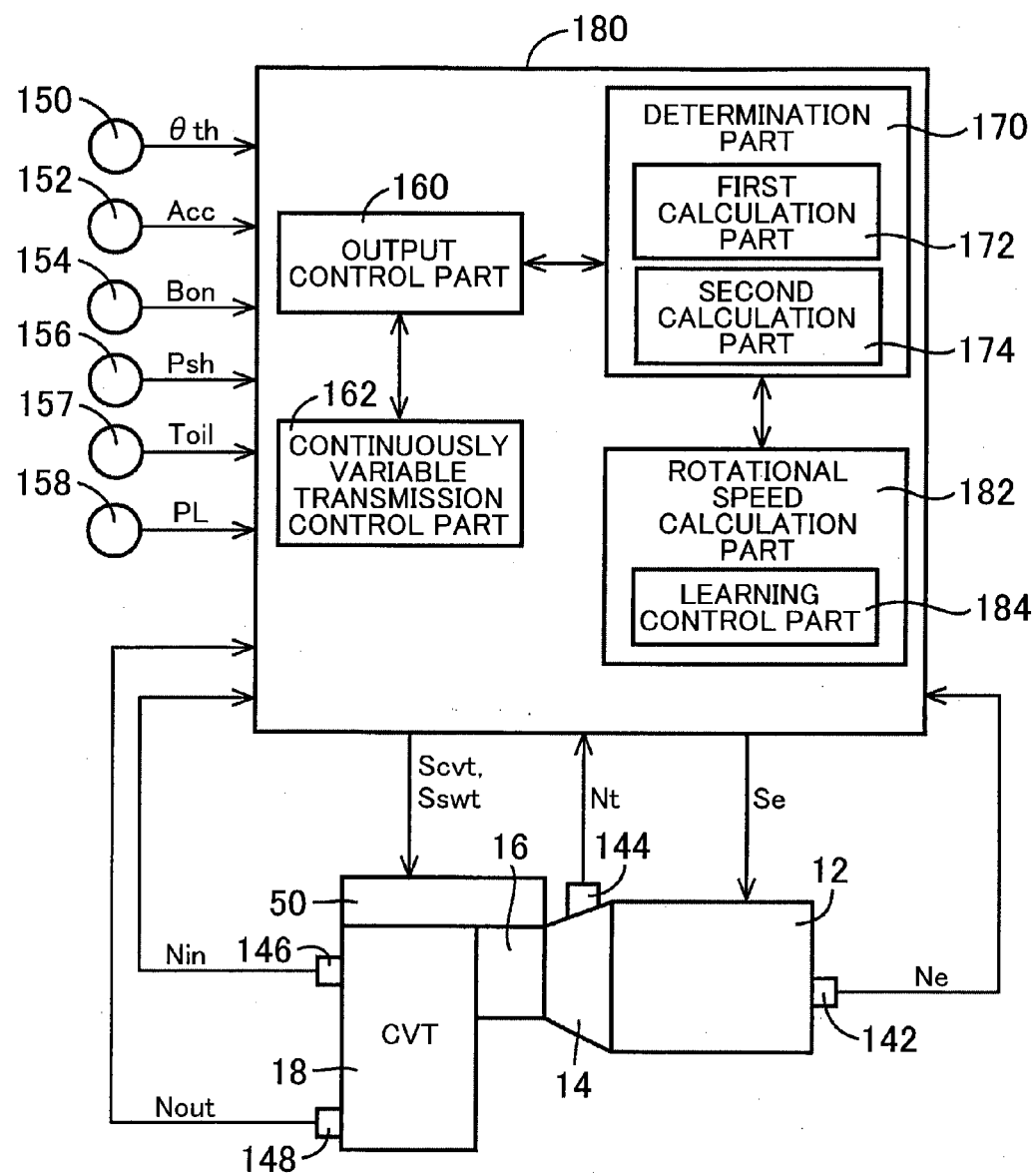
FIG. 7 is a function block diagram explaining a main part of control operation by an electronic control unit as another example.

In the foregoing example, the delivery rate Qout and the consumption flow rate Qloss of the oil pump 28 are calculated as necessary, and the first rotational speed Nep, at which the second delivery pressure P2 is decreased, is calculated based on the flow rate balance between the delivery rate Qout and the consumption flow rate Qloss. In this example, first rotational speed Nep is calculated based on a map that is experimentally obtained in advance. FIG. 7 is a function block diagram explaining a main part of control operations of an electronic control unit 180 according to this example. In comparison between the electronic control unit 180 in FIG. 7 and the electronic control unit 140 in FIG. 5 explained earlier, a specific operation of a rotational speed calculation part 182 is different. The rotational speed calculation part 182, which is different from the foregoing example, is explained below. The other specific functions are similar to those of the foregoing example, and are thus denoted by the same reference numerals and explanation of which is omitted.

The rotational speed calculation part 182 directly calculates first rotational speed Nep, at which second delivery pressure P2 is decreased, based on a relation map of an increase amount ΔNe of engine rotational speed Ne, by which the second delivery pressure P2 is decreased, at given engine rotational speed Ne. The relation map is experimentally obtained in advance. FIG. 8 is an example of the relation map that obtains an increase amount ΔNe of the engine rotational speed Ne, by which the second delivery pressure P2 is decreased, at given engine rotational speed Ne (for example, 1000 rpm). The relation map is structured from, for example, a two-dimensional map of line pressure PL and oil temperature Toil. For example, when the line pressure PL increases, a leakage rate of the hydraulic oil from the hydraulic control circuit increases. In other words, a consumption flow rate of the hydraulic oil increases. Therefore, the increase amount ΔNe of the engine rotational speed Ne, by which the second delivery pressure P2 is decreased, increases. When oil temperature Toil increases, a leakage rate of the hydraulic oil from the hydraulic control circuit increases. In other words, the consumption flow rate of hydraulic oil increases. Therefore, the increase amount ΔNe of the engine rotational speed Ne, by which the second delivery pressure P2 is decreased, increases. Therefore, in FIG. 8, the increase amount ΔNe of engine rotational speed Ne tends to increase in proportion to the line pressure PL and the oil temperature Toil. In the relation map in FIG. 8, the given engine rotational speed Ne is 1000 rpm. However, a relation map is obtained and stored in advance for each engine rotational speed Ne.

The rotational speed calculation part 182 obtains the increase amount ΔNe of the engine rotational speed Ne based on the line pressure PL and the oil temperature Toil that are detected as necessary. Then, by adding a requested increase amount ΔNe to the current rotational speed Ne (Ne+ΔNe), the rotational speed calculation part 182 determines the engine first rotational speed Nep at which the second delivery pressure P2 is decreased. The relation map in FIG. 8 is used for obtaining an increase amount of the engine rotational speed Ne. However, the engine first rotational speed Nep, at which the second delivery pressure P2 is decreased, may be defined directly. By directly obtaining the engine first rotational speed Nep, at which the second delivery pressure P2 is decreased, based on the relation map as stated above, a load of calculation is reduced.

Individual variation and aging deterioration (wear, oil degradation, and so on) occur in each vehicle. If this is taken into consideration, when calculating the engine first rotational speed Nep, at which the second delivery pressure P2 is decreased, by using the above-mentioned relation map, the engine first rotational speed Nep, at which the second delivery pressure P2 is decreased, is set to a high value in advance. Thus, an effect of fuel economy improvement becomes insufficient.

A learning control part 184 in this example increases engine rotational speed Ne when, for example, a vehicle is stopped, obtains the engine first rotational speed Nep, at which the second delivery pressure P2 is decreased, and then carries out learning control to correct a relation map as appropriate based on the first rotational speed Nep. Thus, optimal first rotational speed Nep is obtained in accordance with individual variation and aging deterioration of the vehicle as necessary, and fuel economy is improved even further.

As stated above, in this example, effects similar to those of the foregoing example are obtained. In this example, since the first rotational speed Nep, at which the second delivery pressure P2 is decreased, is obtained based on the relation map, a load of calculation is reduced as well. As the learning control is carried out as necessary to for individual variation and aging deterioration of a vehicle, the relation map is corrected as necessary. Thus, an effect of fuel economy improvement is enhanced even further.

The examples of the invention have been explained so far in detail based on the drawings. However, the invention may also be applied in other forms.

For example, in the above-mentioned examples, the vane type oil pump 28 is employed. Whereas, a gear type oil pump may also be employed as another form of the oil pump. In other words, any oil pump having two delivery ports may be applied as appropriate in other forms. Also, an oil pump having one delivery port is still applicable as appropriate as long as the oil pump has a mechanism that reduces hydraulic pressure of hydraulic oil at the first rotational speed Nep. The invention is also applicable to a driving device having a structure in which two oil pumps are provided and hydraulic pressure of hydraulic oil delivered from one of the oil pumps is decreased at the first rotational speed Nep.

In the forgoing example, the belt type continuously variable transmission 18 is employed. However, the invention is not limited to this type, and may be applied to other types of transmissions such as a troidal type continuously variable transmission as appropriate.

In the electronic control unit 140 according to the above example, the various functions of the electronic control unit 140 (the output control part 160 and so on) are not necessarily classified strictly. For example, the output control part 160 may carry out the functions of the rotational speed calculation part 164 and the determination part 170.

The foregoing is only one of embodiments, and the invention may be carried out in forms with various changes and improvements added based on the knowledge of a person skilled in the art.

What is claimed is:

1. A control device for a driving device,
the driving device including a transmission and a hydraulic pressure generating device,
the transmission being configured to change rotation speed of an engine,
the hydraulic pressure generating device being configured to generate hydraulic pressure fed to the transmission, the hydraulic pressure generating device being configured to be driven by the engine, the hydraulic pressure generating device including an oil pump and a first mechanism,
the oil pump being configured to increase an oil delivery rate in proportion to engine rotational speed of the engine, and
the first mechanism being configured to decrease hydraulic pressure of an oil passage connected with a delivery port of the oil pump, when the oil delivery rate is larger than an oil consumption flow rate of the transmission,
the control device comprising:
an electronic control unit configured to control the engine rotational speed to a first rotational speed and maintain vehicle speed by gear shifting regardless of the control of the engine rotational speed, in a case where, while a vehicle is running in a predetermined running state, fuel consumption is smaller when the engine is driven at the first rotational speed, compared to fuel consumption of the engine in the predetermined running state, the first rotational speed being an engine rotational speed at which hydraulic pressure of the oil passage is decreased, the predetermined running state being a running state in which hydraulic pressure of the oil passage is not decreased.

2. The control device according to claim 1, wherein
the electronic control unit is configured to calculate a fuel consumption increase amount and a fuel consumption decrease amount, the fuel consumption increase amount is an increase amount of fuel when the engine rotational speed is increased to the first rotational speed, and the fuel consumption decrease amount is a decrease amount of fuel caused by a decrease in pump drive torque of the oil pump when the engine rotational speed is increased to the first rotational speed, and
the electronic control unit is configured to determine, when the fuel consumption decrease amount is larger than the fuel consumption increase amount, that the fuel consumption is smaller when the engine is driven at the first rotational speed compared to the fuel consumption of the engine in the predetermined running state.

3. The control device according to claim 1, wherein
the electronic control unit is configured to calculate the first rotational speed.

4. The control device according to claim 3, wherein the electronic control unit is configured to calculate the first rotational speed based on a flow rate balance between oil consumption of the transmission and an oil delivery rate of the oil pump.

5. The control device according to claim 3, wherein the electronic control unit is configured to calculate the first rotational speed based on a relation map that is obtained and stored in advance.

6. The control device according to claim 1, wherein
the oil pump includes a first suction port, a second suction port, a first delivery port, and a second delivery port, the first delivery port is configured to deliver hydraulic oil that is sucked in from the first suction port, the second delivery port is configured to deliver hydraulic oil that is sucked in from the second suction port,
the oil passage is connected with the second delivery port, and
the second suction port and the second delivery port are communicated with each other when the engine rotational speed reaches the first rotational speed.

7. A control method for a driving device,
the driving device including a transmission and a hydraulic pressure generating device, the driving device being controlled by an electronic control unit,
the transmission being configured to change rotation speed of an engine,
the hydraulic pressure generating device being configured to generate hydraulic pressure fed to the transmission, the hydraulic pressure generating device being configured to be driven by the engine, the hydraulic pressure generating device including an oil pump and a first mechanism,
the oil pump being configured to increase an oil delivery rate in proportion to engine rotational speed of the engine, and
the first mechanism being configured to decrease hydraulic pressure of an oil passage connected with a delivery port of the oil pump, when the oil delivery rate is larger than an oil consumption flow rate of the transmission,
the control method comprising:
controlling, by the electronic control unit, the engine rotational speed to a first rotational speed and maintaining vehicle speed by gear shifting regardless of the control of the engine rotational speed, in a case where, while a vehicle is running in a predetermined running state, fuel consumption is smaller when the engine is driven at the first rotational speed, compared to fuel consumption of the engine in the predetermined running state, the first rotational speed being an engine rotational speed at which hydraulic pressure of the oil passage is decreased, the predetermined running state being a running state in which hydraulic pressure of the oil passage is not decreased.

* * * * *